(12) United States Patent
Thompson et al.

(10) Patent No.: US 7,814,571 B2
(45) Date of Patent: Oct. 19, 2010

(54) LIGHTWEIGHT THIN FLEXIBLE POLYMER COATED GLOVE AND A METHOD THEREFOR

(75) Inventors: Eric Thompson, Clemson, SC (US); Dave Narasimhan, Flemington, NJ (US); Jeffrey C. Moreland, Pendleton, SC (US); Hafsah M. Ghazaly, Petaling Jaya (MY)

(73) Assignee: Ansell Healthcare Products LLC, Red Bank, NJ (US)

( * ) Notice: Subject to any disclaimer, the term of this patent is extended or adjusted under 35 U.S.C. 154(b) by 802 days.

(21) Appl. No.: 11/677,176

(22) Filed: Feb. 21, 2007

(65) Prior Publication Data

US 2007/0204381 A1   Sep. 6, 2007

Related U.S. Application Data

(60) Provisional application No. 60/775,948, filed on Feb. 23, 2006.

(51) Int. Cl.
*A41D 19/00* (2006.01)
(52) U.S. Cl. ........................................................ 2/161.6
(58) Field of Classification Search ................ 2/161.1, 2/161.6
See application file for complete search history.

(56) References Cited

U.S. PATENT DOCUMENTS

| | | | |
|---|---|---|---|
| 2,293,928 A * | 8/1942 | Beal ............................ 428/212 |
| 3,934,062 A | 1/1976 | Tillotson et al. | |
| 4,172,293 A | 10/1979 | Vistins | |
| RE30,638 E | 6/1981 | Bryars | |
| 4,497,072 A | 2/1985 | Watanabe | |
| 4,514,460 A | 4/1985 | Johnson | |

(Continued)

FOREIGN PATENT DOCUMENTS

GB    730879    6/1955

(Continued)

OTHER PUBLICATIONS

"PCT International Search Report", (Nov. 13, 2007), PCT/US07/04492.

(Continued)

*Primary Examiner*—Katherine Moran
(74) *Attorney, Agent, or Firm*—Diehl Servilla LLC; Karen M. Whitney; Kenneth M. Zeidner

(57) ABSTRACT

A lightweight thin flexible latex glove article having a polymeric latex coating that penetrates the front portion of a knitted liner half way or more through the liner thickness and for at least a portion of the knitted liner, not penetrating the entire thickness. For example, the liner can be knitted using an 18-gauge needle with 70 to 221 denier nylon 66 multifilament yarn. The polymer latex coating can be 0.75 to 1.25 times the thickness of the knitted liner. Over 30% reduction of glove thickness is achieved resulting in three times greater flexibility. The polymer latex coating may be foamed with 5 to 50 vol % air content. Open celled foamed latex coating may be coated with a dispersion of fluorochemical dispersion to prevent liquid permeation into the glove. The process can include steps to gel the latex emulsion at interstices of the yarn to prevent further penetration of the emulsion into the liner.

25 Claims, 5 Drawing Sheets

U.S. PATENT DOCUMENTS

| | | | |
|---|---|---|---|
| 4,515,851 A | 5/1985 | Johnson | |
| 4,555,813 A | 12/1985 | Johnson | |
| 4,567,612 A * | 2/1986 | Johnson | 2/161.8 |
| 4,569,707 A | 2/1986 | Johnson | |
| 4,589,940 A | 5/1986 | Johnson | |
| 4,785,479 A | 11/1988 | Watanabe | |
| 4,901,372 A | 2/1990 | Pierce | |
| 5,070,540 A * | 12/1991 | Bettcher et al. | 2/2.5 |
| 5,322,726 A | 6/1994 | Dew | |
| 5,322,729 A | 6/1994 | Heeter et al. | |
| 5,581,812 A | 12/1996 | Krocheski | |
| 5,799,333 A | 9/1998 | McGarry et al. | |
| 5,822,791 A * | 10/1998 | Baris | 2/2.5 |
| 5,833,911 A | 11/1998 | Llort et al. | |
| 5,846,604 A | 12/1998 | Caldwell | |
| 6,527,990 B2 | 3/2003 | Yamashita et al. | |
| 6,543,059 B2 * | 4/2003 | Szczesuil et al. | 2/161.6 |
| 6,566,435 B1 | 5/2003 | Teoh et al. | |
| 6,772,443 B2 | 8/2004 | Soerens et al. | |
| 2002/0076503 A1 | 6/2002 | Borreani et al. | |
| 2004/0221364 A1 | 11/2004 | Dillard et al. | |
| 2005/0035493 A1 | 2/2005 | Flather et al. | |
| 2006/0251839 A1 * | 11/2006 | Wang et al. | 428/35.7 |
| 2007/0022511 A1 * | 2/2007 | Narasimhan et al. | 2/159 |

FOREIGN PATENT DOCUMENTS

| | | |
|---|---|---|
| GB | 2400051 | 10/2004 |
| WO | WO-2005088005 | 9/2005 |

OTHER PUBLICATIONS

PCT International Search Report for PCT/US07/04492, (Nov. 13, 2007), 2 pp.

PCT Written Opinion for PCT/US07/04492, (Nov. 13, 2007), 7 pp.

* cited by examiner

LIGHTWEIGHT THIN FLEXIBLE POLYMER COATED GLOVE AND A METHOD THEREFOR

CROSS-REFERENCE TO RELATED APPLICATION

This application claims the benefit of priority under 35 U.S.C. §119(e) to U.S. Provisional Application No. 60/775,948, filed Feb. 23, 2006, the disclosure of which is hereby incorporated by reference in its entirety.

FIELD

Aspects of the invention relate to a lightweight thin flexible latex article having a thin knitted liner partially covered and penetrated by a thin porous or continuous latex layer thereby providing enhanced flexibility. The porous latex layer can be treated to provide breathability without water or oil permeability.

BACKGROUND

Gloves are commonly used to protect hands in an industrial or household environment. The gloves, upon wearing, fill with sweat and feel clammy to the user. Advances in glove manufacturing technologies have resulted in partial coating of a fabric knitted liner with an adherent latex layer so that glove is breathable in the exposed knitted areas. The knitted liners are fabricated from relatively thick robust yarns with a 319 denier, (a denier defined as number of grams of a 9000 meter yarn) or greater using 15-gauge knitting needles or larger. The latex layer formed is also correspondingly thick resulting in a glove with a heavy feel that has limited flexibility. When the latex layer used is made porous in order to provide breathability, the resulting thickness of the porous latex layer is generally greater resulting in an awkward feeling glove with limited touch sensitivity. For equivalent wear resistance, the foam layer must be thicker than a non-foamed layer. A number of patents address gloves and their forming methods using relatively thick knitted liner and a thick coating of latex layers. The combination of a thick knitted liner and a thick foamed latex layer do not result in a small overall glove thickness and the glove product does not provide flexibility and easy mobility of fingers and hand.

U.S. Pat. Nos. 4,514,460 and 4,515,851 to Johnson disclose slip resistant surfaces. U.S. Pat. Nos. 4,555,813 and 4,567,612 to Johnson discloses slip resistant gloves. U.S. Pat. Nos. 4,569,707 and 4,589,940 to Johnson disclose methods of making foamed slip resistant surfaces. This porous surface is particularly useful for workers in work environments wherein the gloves are breathable and have moisture-absorbing properties. The surface is a foam surface laminated to a knitted or woven web substrate. The polyurethane, polyvinyl chloride, acrylonitrile; natural rubber, synthetic rubber foam, prior to lamination, may be foamed with varying amounts of air depending upon the degree of abrasion resistance required. The foaming may be by mechanical or chemical means.

U.S. Pat. Nos. 4,497,072 and 4,785,479 to Watanabe disclose porous coated glove and method of making a glove. Broken air bubbles form the porous surface. The air cells are closed and provide cold protection and waterproof qualities. The thick closed cell foam is bonded to woven or knitted sewn fabric. Due to its cold protection properties this is a thick glove with minimal flexibility.

U.S. Pat. No. 5,322,729 to Heeter et al. discloses method and apparatus for producing a breathable coated fabric. The method involves coating a fabric substrate with a resin then opening pores in the resin by directing a flow of air through the fabric substrate and resin coating. The pores provide breathability of the coated fabric and allow for a vapor or moisture transmission rate about ten times that of a resin coated fabric without pores. Forcing air through uncured resin generally results in uncontrolled airflow passages and in the worst case, delamination of the resin from the fabric.

U.S. Pat. No. 5,581,812 to Krocheski discloses a leak proof textile glove. A cotton glove is inverted and dipped in a PVC or polyurethane latex solution to make the cotton glove impervious to water or oil. The glove is inverted so that the cotton surface is the gripping surface while the latex layer contacts the skin. The latex layer may be optionally flocked to provide a better skin feel. There is no knitted liner in this glove. The latex layer applied is impervious to water or oil, but is not breathable.

U.S. Pat. No. 6,527,990 to Yamashita et al. discloses a method for producing a rubber glove. The rubber glove is made by sequential immersion of a glove mold in coagulating synthetic rubber latex that contains thermally expansible microcapsules. During the vulcanization of the synthetic rubber latex, these microcapsules burst providing excellent anti-blocking and grip under wet or dry conditions. There is no knitted liner in this glove and the latex layer completely surrounds the hand.

U.S. Patent Publication 2002/0076503 to Borreani discloses a clothing article such as a working or protective glove made from textile support. The textile support receives an adherence primer in the form of an aqueous calcium nitrate. The textile support with the adherence primer is coated with a foamed aqueous polymer, preferably an aliphatic polyether urethane or polyester urethane entirely or partially. The foamed aqueous polymer only appears on the support outer part without going through the textile support mesh. When the textile support is too hydrophilic, 2-5% fluorocarbon is added to the aqueous latex emulsion. The size of the yarn in the textile support is not indicated. The patent does not indicate why the aqueous polymer does not penetrate the textile support mesh. The viscosity of the aqueous air foam is in the range of 1500 to 3000 centipoise and this thick foam may not enter the mesh, but only contacts the fibers at very localized regions creating a poor bond between the polymeric layer and the textile support.

U.S. Patent Publication 2004/0221364 to Dillard et al. discloses methods, apparatus, and articles of manufacture for providing a foam glove. A textile shell is coated with a foamed polymeric coating that is supported in part by the surface of the textile shell. Sufficient amount of air mixed with the base polymer to lower the density of the base polymer between about 10 to 50% of the original density of the base polymer. The textile shell is knitted using nylon, polyester, aramid, cotton, wool, rayon or acrylic fibers. The foam cells absorb liquid, which indicates that the foamed polymer does not protect the hand from water or oil present on the object being gripped. The yarn is said to be knitted with a 15-gauge needle using a Shima Seki knitting machine that fixes the size of the knitted textile shell to be a thick shell, not a thin shell. As a result, the foam glove is a thick product and is not very flexible.

GB 730879 discloses laminated material and method of making same. The laminated material comprises a backing layer and a foam latex layer secured together by penetration substantially half way through the backing layer fabric, the exposed surface of the latex layer having had removed by friction that outer portion which can be readily separated there from. The penetrated foam does not separate by friction. This is not a foam layer on a backing layer that remains intact during use.

GB 2400051 and WO2005088005 disclose a polymeric garment material. The polymeric garment material is made by applying coagulant to a substrate, which may be present on a mould, applying foam of a polymeric material to the substrate, allowing the coagulant to coagulate some of the foam and removing uncoagulated foam from the substrate to leave a layer of coagulated polymeric material on the substrate. Spraying liquid such as water or directing a jet of gas such as air onto the substrate may remove the uncoagulated foam. After removing uncoagulated foam, the substrate may be immersed in water to remove coagulant. The polymeric material may be one or more of nitrile latex, natural latex, polyurethane latex, polyvinyl chloride latex, neoprene and polyvinylacetate. Blasting the foam leaves only a portion of the applied foam layer providing non-uniform coverage of the foamed elastomeric layer. The pressure of the jet may force the uncured gelled polymer into the interstices between the fibers of the substrate.

Accordingly, there is a need in the art for thin lightweight highly flexible latex gloves that has the latex layer applied to only portions of the lightweight knitted liner providing breathability of the glove. It is also desirable to have a latex layer that is porous providing additional breathability and improved flexibility. It is desirable to prevent entry of oil or water through the porous latex layer.

SUMMARY

The flexibility of a glove is a strong function of the thickness of the glove and increases according to the inverse of the cube of the thickness. Thus a reduction of the thickness of an elastic body such as a latex layer coated glove by 30 percent increases the flexibility by a factor of three. The thickness of the glove is made up of the thickness of the knitted liner and the thickness of the adherently bonded polymeric layer. The flexibility may be greater than that expected based on elastic body calculation since the knitted liner is capable of displacing at the knitted yarn level. This factor is even more significant when the individual yarn is made up of a plurality of strands instead of being a monofilament yarn. This enhancement in flexibility is lost, if the polymer completely penetrates the liner; the stiffness of the glove drastically increases due to the stiffening of the knitted layer.

Typically, for coated knitted work gloves, a commonly used knitting needle is a 15-gauge needle. Shima Seiki manufactures knitting machines that are capable of using finer knitting machine needle size, such as an 18-gauge needle. According to Spencer D. J. Knitting Technology, p 209, 1993, the gauge of the knitting machine needle has a definite relationship with the denier of the yarn that can be used. For example, a needle of gauge 15 uses 319 denier yarn. However, a needle of gauge 18 uses 221 denier yarn. Denier is defined as number of grams of a yarn having a length of 9000 meters. Therefore, a liner knitted by an 18-gauge needle is approximately 30% lighter than a liner knitted with a 15-gauge needle. The small diameter of 221 denier yarn knitted with an 18-gauge needle also has higher packing density per square unit area, thereby presenting a smoother surface for latex dip resulting in a smoother, smaller thickness of latex.

Since the yarn size of an 18-gauge needle yarn is smaller than that of a 15-gauge yarn, the 18-gauge thin knitted liner has smaller spaces between the stitches and/or yarns. Use of this 18-gauge knitting needle generally means that the stitches and/or yarns in the knitted liner are spaced one to three times the yarn diameter. As such, small interstices are provided between the yarns and/or stitches. In order to bond a latex layer to the thin knitted liner the latex should penetrate half way or more through the thickness of the thin knitted liner. A penetration of the latex layer less than half the thickness generally results in poor adhesion, and can result in unexpected separation of the latex layer. However, if the entire latex layer penetrates the knitted liner completely, the polymeric coating is available for contacting the skin of the glove wearer resulting in undesirable effects and sometimes irritation. This problem can be, and has been previously, managed using a 15-gauge needle yarn due to the large thickness of the liner available. This balance between adhesion of the latex layer and prevention of skin contact of the penetrated latex has not been solved for 18-gauge needle yarn, particularly when using an aqueous latex emulsion.

Generally stated, an aspect of the present invention provides a glove with a thin knitted liner and a polymeric latex coating layer which is approximately 0.75 to 1.25 times the thickness of the knitted layer, whereby the polymeric latex coating penetrates half way or more through the thickness, and for at least a portion of the knitted liner, the polymeric latex coating does not penetrate the entire thickness of the thin knitted liner. Yarn size is 221 denier or less. In one embodiment, an 18-gauge needle is used to knit the liner. In another embodiment, a skin-contacting surface of the knitted liner is substantially free of the polymeric latex coating. By reference to being substantially free of the polymeric latex coating, it is meant that more than a majority the surface area of the skin-contacting surface of the knitted liner has no latex coating. In one embodiment, the skin-contacting surface of the knitted liner is approximately 75% or more free of the polymeric latex coating. In one embodiment, the yarn used is partially oriented nylon 66, with a specification 2-ply/70 denier/103 filament or 2 ends of 1-ply/70 denier/103 filament, each filament having 0.68 denier, typically a filament with a denier that is less than 1 denier per filament. This bundle of multifilament yarn with a large number of very small denier filaments is very highly flexible and therefore, the knitted liner is also very highly flexible. The 18-gauge needle can take a single yarn of 2 ply of 70 denier yarn or 1 ply yarn of 140 denier yarn or a yarn as large as 221 denier to knit the liner. The polymeric latex layer is only coated over selected portions of the glove generally including the palm and finger regions of the glove while the portion of the liner at the back of the hand are not coated with the polymeric latex layer. In detailed embodiments, the polymeric latex coating is selected from a group consisting of natural rubber, synthetic polyisoprene, styrene-butadiene, carboxylated or non-carboxylated acrylonitrile-butadiene, polychloroprene, polyacrylic, butyl rubber, or water-based polyurethane (polyester based or polyether based), or combinations thereof. In a specific embodiment, the polymer comprises carboxylated acrylonitrile-butadiene latex formed from an aqueous latex emulsion. In an embodiment, the overall thickness of the glove is in the range of 0.6 mm to 1.14 mm. In a detailed embodiment, the overall thickness is from approximately 0.70 to approximately 0.90 mm.

In a second embodiment, the polymeric latex layer is foamed using well dispersed air cells in the range of 5 to 50 volumetric percentage forming closed cells or open cells with interconnected porosity in the polymeric latex layer. Closed cells provide a liquid proof polymeric latex coating that is highly flexible, soft and spongy, and provides good dry and wet grip. Closed cells are normally associated with air content in the 5 to 15 volumetric percent range. Open cells that are interconnected normally occur in the 15-50% air volumetric range and provide breathability of the glove through the foamed polymeric latex layer. The glove with open cell foam exhibits breathability in the sense that one can blow air through the polymeric latex coating of the glove by cupping the mouth, encountering very little resistance. Breathability of the glove is always available through portions of the knitted liner that is not coated with the foamed polymeric latex layer, such as the backside of the glove. This foamed polymeric latex layer also penetrates half or more of the thickness of the knitted liner, and for at least a portion of the knitted liner, the polymeric latex layer does not penetrate the entire thickness, thereby substantially avoiding skin contact of the polymeric latex.

In a third embodiment, the external surface of the unfoamed or foamed polymeric latex layer is coated with an aqueous fluorochemical dispersion coating immediately after aqueous latex dip prior to curing, approximately 0.5 to 2 microns thick that cures together with the latex layer during vulcanization heat treatment, changing the contact angle of any liquid such as water or oil preventing their entry through the fine dimensioned pores of the foamed polymeric latex layer or any imperfections in the unfoamed latex layer. Thus, breathability of the foamed polymeric latex layer is preserved without the penetration of oil or water from entering the interior of the glove.

In a fourth embodiment, the polymeric latex layer is provided with a plurality of cavities so that the external latex surface of a glove has superior gripping properties of wet, oily, and/or dry surfaces. The enhanced surface area provided by the cavities provides for surface area for capturing boundary layer oil or water film from the work surface, which is being gripped. Moreover, application gripping pressure displaces the boundary layer of oil or water from the boundary layer over the work article and pushes it into the volume of the cavities. Since the lightweight knitted liner of the present invention is relatively low in thickness and the corresponding latex layer thickness is also small, the cavities need to be limited in its penetration depth. The process of creation of cavities that are uniformly distributed over the latex external surface is disclosed in US Patent Publication No. 2005/0035493 to Flather et al., the content of which is hereby incorporated by reference in its entirety.

A method of manufacturing lightweight thin flexible polymer coated gloves in accordance with one aspect of the present invention comprises the steps of 1) dressing a hand shaped ceramic or metallic former with an 18-gauge knitted liner, 2) immersing the former with the knitted liner in a coagulant solution comprising, for example, calcium nitrate coagulating solvent or alcoholic solution or aqueous solution or combinations thereof, 3) removing the former with coagulant coated knitted liner, 4) dipping the former with coagulant coated knitted liner into a tank containing an aqueous polymeric latex emulsion to a precise depth so that the polymeric latex emulsion penetrates half way or more a thickness of the knitted liner and for at least a portion of the knitted liner, the polymeric latex emulsion not penetrating the entire thickness of the knitted liner; and the coagulant gels the polymeric latex preventing further penetration of the latex into the thickness of the knitted liner 5) removing the former with knitted liner with polymeric latex coating, 6) washing the former with the gelled polymeric latex coating, 7) heating to vulcanization temperature for selected time period and 8) additional washing the glove to remove coagulant and offensive latex proteins and latex stabilization and processing chemicals. The process variables, which control the penetration of the polymeric latex emulsion include, control of viscosity of the emulsion and control of dip depth in the polymeric latex emulsion tank. Without intending to be bound by theory, hydraulic pressure in the tank of aqueous polymeric latex emulsion also contributes to the depth of penetration. After washing according to step 6, the external surface of the foamed polymeric latex coating may be coated with an aqueous or solvent-based aqueous fluorochemical dispersion coating and vulcanized according to steps 7 and 8 to create a hydrophobic and oleophobic coating preventing entry of oil or water through any imperfection of the latex layer.

In a second embodiment of the process, the polymeric latex solution of step 4 is foamed using air pressure or mechanical agitation. The penetration of the foamed polymeric latex emulsion through the entire thickness of the knitted liner, for at least a portion of the knitted liner, is prevented either by control of depth of immersion as detailed in the first embodiment or by blocking as detailed in the third embodiment detailed below. The process variables, which control the penetration of the foamed polymeric latex emulsion, include control of viscosity of the emulsion and control of dip depth in the polymeric latex emulsion tank. After washing, according to step 6, the external surface of the foamed polymeric latex coating may be coated with an aqueous or solvent-based aqueous fluorochemical dispersion coating and vulcanized according to steps 7 and 8 to create a hydrophobic and oleophobic coating. The foam may provide breathability especially when air content is in the range of 15-50% providing a open celled structure, yet the fluorochemical coating prevents entry of oil or water into the interior of the glove.

In a third embodiment, the knitted liner is first dressed on a hand shaped former. The external surface of the knitted liner is coated with a viscous thick coating of a blocking coating of, for example, high molecular weight PVA, molten wax, solvent-based polyurethane, or combinations thereof, or other materials that block the interstices between the yarns of the knitted liner. Advantageously, a suitable blocking compound may be added to the coagulant solution. Optionally, the blocked knitted liner is stripped from the former and is inverted and dressed on a hand shaped ceramic or metallic former. The steps listed in the first embodiment are carried out except that in step 4, no special care is needed to control the depth of immersion of the former with the knitted liner since the polymeric latex emulsion cannot penetrate the full thickness of the knitted liner since the interstices between the yarns are blocked by, for example, PVA, wax, solvent-based polyurethane, or the like. During step 6, certain blocking materials, for example, PVA or wax, are removed during the washing step. The PVA, for example, decomposes and the wax, for example, drips away. Because of this, portions of the skin-contacting surface of the glove are free of the polymeric latex coating, and exposure of a user's skin to the polymeric latex coating is minimized. Solvent-based polyurethane as a blocking agent is especially useful since it need not be removed from the knitted liner since a solvent-based polyurethane coating presents a skin friendly surface, unlike polymeric latexes.

In a fourth embodiment of the process, the method of manufacture includes dipping a coagulant coated knitted liner dressed on a former first in an aqueous latex emulsion to seal off the inter fiber spaces in the knitted liner and latex penetrating more than half way through the liner, but not penetrating the liner all the way. This thin latex layer coated liner is further dipped in a second latex bath and the knitted liner with the second layer of latex is subjected to a fluidized bed salt treatment. The salt particles, which are individually separated and kept afloat by the fluidized bed contact the second layer which immediately gels the latex replicating the shape of the salt particle. This salt containing second layer that is present over the first latex later and the knitted liner is subjected to water wash to remove the salt particles. This washing action does not change the cavity structure produced in the second latex layer since the second latex layer is already gelled and has some mechanical integrity. The washed glove is then subject to vulcanization heat treatment, which cures the first and second latex layers and bonds them together.

The features of the lightweight thin flexible polymer coated glove include, singly or in combination, the features set forth below:

First, a lightweight thing flexible liner is prepared from a yarn of 221 denier or less. In one embodiment, an 18-gauge needle is be used to knit the lightweight thin flexible liner.

Second, various yarn configurations can be used to achieve an overall denier of 221 or less. For example, an 18-gauge needle is capable of using 2 twisted strands of 1-ply/70 denier/103 filament nylon 66 yarn (140 denier), or one strand of a 2-ply/70 denier/103 filament nylon 66 yarn (140 denier), or one strand of a 221 denier yarn in the thin liner knitting process. Generally, any combination of strands, plys, and strand deniers can be used to result in a yarn having a denier of 221 or less.

Third, the lightweight thin knitted liner has a weight and thickness of approximately 30% less than standard knitted liners using a 15-gauge needle. A corresponding latex coated lightweight thin knitted liner glove will likewise be thinner and lighter than a latex-coated knitter liner from a 15-gauge needle.

Fourth, the lightweight thin knitted liner is made of a mesh that is closely spaced with small interstices. The interstices between the yarns of the knitted liner are typically from one to three times the diameter of the yarn used, when using a properly sized needle gauge. This parameter is easily obtained by proper selection of the yarn and knitting parameters. However, when a knitting needle having an excessive size is used, the spacing between the yarns in the knitted liner is much larger and is generally unsuited for latex dipping since polymeric latex emulsion penetrates the entire thickness of the liner.

Fifth, a coating geometry, in a detailed embodiment, is provided wherein said knitted liner is coated with a polymeric latex coating that typically penetrates halfway or more through the thickness of the knitted liner providing excellent adhesion of said coating to the liner, but the coating preferably does not penetrate the entire thickness of said knitted liner, for at least a portion of the knitted liner, thereby substantially reducing contact of the coating with a user's skin.

Sixth, the geometry, in another detailed embodiment, is created by a process wherein a knitted liner is dressed on a former, dipped in a coagulant and subsequently dipped to a predetermined depth in an aqueous polymeric latex emulsion tank or the interstices being blocked prior to dressing on the former creating gelled regions at the interstices between fibers in the knitted liner substantially preventing further penetration of the emulsion through the thickness of the liner.

Seventh, the geometry, in a specific embodiment, is created by first blocking the interstices between the yarns in a coagulant coated knitted liner, and then coating opposing surface of the liner with a polymeric latex emulsion to create a polymeric latex coating that penetrates half way or more through the thickness of the knitted liner, and for at least a portion of the knitted liner, the polymeric latex does not penetrate the entire thickness of the knitted liner.

Eighth, the gripping surface of the latex layer of the glove is provided with plurality of cavities providing improved wet, oil surface, dry grip by increasing the friction and removing boundary liquid or oil film from the work surface.

DETAILED DESCRIPTION

Figure 1:
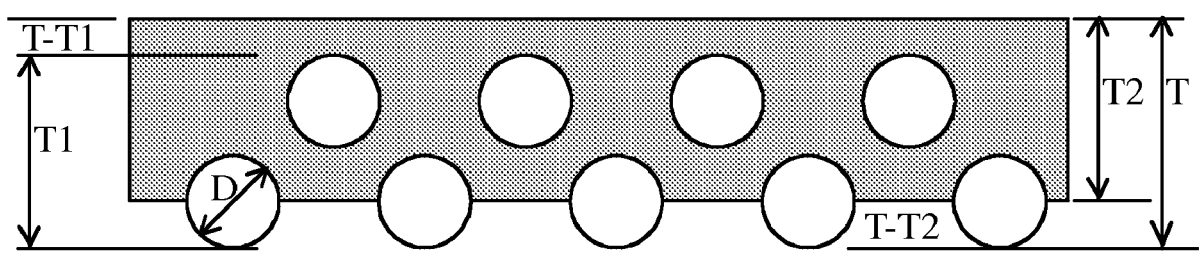
FIG. 1 shows a schematic diagram of a knitted liner with the polymeric latex layer penetrating half way or more through the thickness of the knitted liner.

The flexibility of an elastic article is strongly determined by the geometry of the object. An elastic beam having a width 'B' with a thickness 'T' and a length 'L' subjected to a central load 'P' has a maximum deflection 'δ' at the load point given by the equation:

$$\delta = \frac{PL^4}{48 \, EI}$$

where 'E' is the elastic modulus and I is the moment of inertia about the neutral axis given by the equation:

$$I = \frac{BT^3}{12}$$

where 'B' is the width of the beam and 'T' is the thickness of the beam. Similar relationship exists for other loading geometries of 'P'. In all cases, 'δ', the deflection is inversely proportional to the third power of the thickness 'T'. Therefore decreasing the thickness of the beam by 30 percent results in an increase in deflection or flexibility by a factor of 2.91 or nearly three.

Flexibility of gloves having an elastomeric coating, such as a glove latex coating, can be increased by decreasing the thickness of the glove. Since the glove has a knitted liner the flexibility may be enhanced by only partially penetrating the knitted liner thereby taking advantage of the knitted liner due to relative movement between the yarns of the knitted liner and the movement between the filaments of an individual yarn. This enhanced flexibility requires use of a thinner knitted liner and applying a thinner polymeric coating. Challenges are encountered in each of these approaches as discussed next.

Conventional knitting machines such as those supplied by Shima Seiki traditionally use a 15-gauge needle for knitting glove liners. This needle can accommodate a total yarn denier of 319 as indicated by p 209 of the book Knitting Technology by D. J. Spencer, published in 1993. A denier is the weight of the yarn in grams for a yarn length of 9000 meters. Considering nylon 66, which has a density of 1.13 g/cm³, the volume of 319 grams is 282 cm³. The average cross-sectional area of the 9000 meter yarn, in turn, is 0.031 mm, thereby resulting in a yarn having an average yarn diameter of 0.19 mm. This cross-section diameter calculation reflects the result for a single monofilament yarn, but a multifilament yarn of the same denier may have substantially larger cross-section diameter since voids are present between multiple filaments of the yarn. When these yarns are knitted to form a liner, at the crossing points, the cross-section diameter is nominally 0.38 mm. Since these yarns are normally produced by twisting multiple strands of finer filaments, the yarn diameter may be larger and correspondingly, the knitted liner may be thicker. In addition, the knitting process has a certain degree of slackness; the thickness of the knitted liner may be larger due to this slackness. For example, two ends of 2 ply/70 denier/34 filament with each filament having a denier of 2.08 has a total nominal denier of 280, which is suited for knitting with a 15-gauge needle to produce a prior art standard liner that is dipped with latex to produce a standard prior art glove. A liner prepared from such a yarn has a measured uncompressed thickness of 1.34 mm and a compressed thickness under 9 oz (225 grams) load of 1.13 mm using an Ames Logic basic thickness gauge model no. BG1110-1-04 according to ASTM D1777. The knitted liner is measured to have a basis weight of 167.9±5.3 grams/mm$^2$. When the knitted liner is coated with the polymeric latex emulsion, the yarns tend to come together providing a knitted liner thickness approximating the compressed thickness. The thickness of the polymeric latex coating approximates the thickness of the knitted liner. A 15-gauge knitted liner prepared from two ends of 2 ply/70 denier/34 filament coated with a polymeric latex coating results in a glove thickness of 1.15 mm to 1.5 mm such as Ansell 11-800. Ansell 11-600 glove which is a 15-gauge knitted glove is coated with solvent-based polyurethane with complete penetration and has a thickness nearly equal to that of the knitted liner which is approximately 1 mm. A Showa product BO-500 also uses a 15-gauge knitted liner which is completely penetrated by solvent-based polyurethane has a thickness nearly equal to that of the knitted liner which is approximately 1 mm.

Shima Seiki also has knitting machines that can use 18-gauge needles. Thus, smaller denier yarns may be used to produce knitted liners. According to p 209 of the book Knitting Technology by D. J. Spencer, published in 1993 the 18-gauge needle can use yarn with a total denier of 221. Considering the density of nylon 66 (1.13 g/cm$^3$), this yarn has a volume of 195 cm$^3$. The average cross-sectional area of the 9000 meter yarn, in turn, is 0.021 mm$^2$, thereby resulting in a yarn having an average yarn diameter of 0.16 mm. However, when a 140 denier yarn is used, the cross-sectional area is 0.014 mm$^2$ or an average yarn diameter is 0.13 mm. Thus, at yarn cross-over points, when using a 221 denier yarn, the knitted liner will have a minimum thickness of 0.32 mm. In practice this thickness is expected to be larger due to use of multiple filaments. In a specific example, a 70 denier yarn made-up of 103 filaments of 0.68 denier can be used. The knitted liner also has a certain degree slackness. In addition to the use of 2 ends of a 1-ply 70 denier/103 filament yarn, the process may use a 2-ply/70 denier/103 filament yarn with a 140 denier or a 221 denier yarn to knit a liner. The use of a single 2-ply/70 denier/103 filament yarn wherein each filament has 0.68 denier resulted in a knitted liner, which is 0.83 mm in the uncompressed state and 0.67 mm in the compressed state under 9 oz (225 grams) load using Ames Basic Logic thickness gauge model no. BG1110-1-04 according to ASTM D1777. This knitted liner is measured to have a basis weight of 142.9±1.3 grams/m$^2$. When this 18-gauge needle knitted liner is coated with polymeric latex coating with a latex layer thickness close to the thickness of the knitted liner, the glove has a final thickness in the range of 0.6 mm to 1.14 mm. In a detailed embodiment, the glove has a thickness of from approximately 0.70 to approximately 0.90 mm. Since the yarn is made from very fine diameter partially oriented fibers, the flexibility of the yarn is very good. Thus the thickness of the glove is reduced by better than 30% providing better than 3 times improvement in the flexibility of the glove compared to a glove having a liner knitted from a 15-gauge needle. The overall weight of the latex glove is, likewise, lighter.

The gauge knitting needle used is generally selected according to the denier of the yarn being used. However, it is possible to use a larger gauge needle for a smaller denier yarn and this combination results in excessive spacing between the yarns in the knitted liner, which is larger than the desired one to three range. This is illustrated by the variations in the spacing between yarns in a knitted liner when 15-gauge and 18-gauge knitting needles are used. The interstices space is typically in the range of one to three times the diameter of the yarn used to knit the liner, when a proper needle gauge is selected. The 15-gauge needle can use a 280 denier yarn, having an average yarn diameter of 0.19 mm. The 18-gauge needle can use a 140 denier yarn, having an average yarn diameter of 0.13 mm. The relationship between the yarn diameter and the interstices changes when the liner is put on a former so that the interstices diameter can be three times larger than the yarn diameter.

Technical problems exist when thin knitted liners are coated with aqueous polymeric latex. Difficulties with adhering the latex layer to the thin knitted liner and irritation to the skin of certain users upon contact with the latex layer have been recognized. As such, 18-gauge needle-knitted liners thus far have not been coated with aqueous polymeric latex emulsions. To address these technical problems, in accordance with aspects of the present invention, the reduced thickness of the knitted liner requires the polymeric latex emulsion to penetrate approximately half way or more to create adhesion between the polymeric latex coating and the knitted liner. For at least a portion of the knitted liner, the latex layer does not penetrate the entire thickness of the knitted liner, thereby substantially reducing contact between the polymeric latex and the user's skin when the glove is worn. The overall margin of error is significantly reduced with approaches according to aspects of the present invention.

Attempts to produce thinner gloves such as Ansell 11-600 or Showa BO-500, which use 15-gauge needle knitted liners and have thicknesses which are penetrated by solvent-based polyurethane, result in stiff gloves. The liners of these gloves become completely penetrated by the solvent-based polyurethane, thereby reinforcing the liner and increasing its elastic modulus 'E', and thereby decreasing the deflection. Also chemicals used in the solvent-based polyurethane do not readily wash off resulting in a stiffer glove. Despite this, in certain embodiments of the present invention, solvent-based polyurethanes are acceptable blocking agents and can be used along with the polymeric latex coatings which penetrate half way or more and for at least a portion of the knitted liner. The gloves of aspects of the present invention accomplish this glove geometry regardless of the yarn size using, for example, an 18-gauge needle.

FIG. 1 illustrates schematically the arrangement of yarns in the knitted liner and its relationship to the polymeric latex coating, which may be foamed or unfoamed. The yarns having an average diameter D are knitted in the liner producing a liner with a thickness T1. The polymeric latex coating of thickness T2 penetrates the knitted liner producing an overall glove thickness. For at least a portion of the knitted liner, the distance defined by T-T2 is not penetrated by the polymeric latex coating and the degree of penetration is defined by the ratio (T-T2)/T1. If the coating penetrates the entire thickness of the liner, the unpenetrated region is zero regardless of the thickness T1 of the knitted liner. The polymeric latex coating that is present outside the liner is given by T-T1. Therefore, T2, the thickness of the polymeric latex coating, is generally in the range 0.75 to 1.25 of the thickness of the knitted liner T1. When the ratio is 0.75, the polymeric latex coating penetrates three quarters of the way into the liner when the top of the coating is flush with the fibers. The penetration may be smaller, but still greater than half way results in polymeric latex coating extending above the top of the fibers. At the ratio of 1.25, a polymeric latex coating penetrating three quarter way still has half the thickness of the polymeric latex coating outside the knitted liner. In this range, the geometry of FIG. 1 is accomplished with the polymeric latex coating covering the knitted liner, but not penetrating the entire thickness of the knitted liner.

A comparison is provided in Table I of typical properties as measured for an Ansell 11-800 glove with a 15-gauge knitted liner with a latex coating produced from an aqueous polymeric latex Ansell 11-600 with a 15-gauge knitted liner fully penetrated by solvent-based polyurethane coating, a Showa product BO-500 with a 15-gauge liner fully penetrated with solvent-based polyurethane. An exemplary glove according the present invention, referred to as Example I, was prepared using an 18-gauge knitted liner partially penetrated with carboxylated acrylonitrile-butadiene latex and is also shown in Table I. These examples were chosen since they directly compare a 15-gauge needle conventional product with an 18-gauge product that is manufactured by methodology of the present invention. The Ansell 11-800 glove typically has a thickness of 1.15 to 1.5 mm while the thickness of a glove according to the present invention is 0.60 mm to 1.14 mm. In a detailed embodiment, the glove has a thickness of approximately 0.70 to approximately 0.90 mm. Accordingly the glove according to Example I is more flexible and provides better tactile sensitivity. The exemplary size 8 glove of Example I weighs 14.8 grams on average, while a similar size 8, 11-800 glove weighs 19.2 to 20.7 grams. Table I also shows the effectiveness of aqueous fluorochemical (FC) coating on the oil permeability on the product of Example I.

ness of 5.25 cm, while the glove according to Example I has a Clark stiffness of 4.2 cm. A glove according to Example I was treated with a fluorochemical (FC) dispersion coating. The oil permeabilities of this treated glove and an untreated glove of Example I were measured. The glove with the FC treatment showed improvement in the oil impermeability as shown in Table I. The gloves of embodiments of the present invention have excellent dry grip, water grip and oil grip.

The manufacturing process for the lightweight thin flexible polymer coated glove involves several steps. In a detailed embodiment, an 18-gauge knitted liner with nominally 140 denier nylon 66 yarn is dressed on a hand shaped ceramic or metallic former and is immersed in a 2-15 wt % calcium nitrate aqueous solution. The calcium nitrate coagulant solution penetrates the entire thickness of the knitted liner. When this coagulant coated liner contacts aqueous polymeric latex emulsion, it destabilizes the emulsion and gels the latex. The coagulant coated knitted liner dressed on the former is next dipped in the aqueous polymeric latex emulsion. The polymeric aqueous latex has a viscosity in the range of 250-5000 centipoise and has commonly used stabilizers including but not limited to potassium hydroxide, ammonia, sulfonates and others. The latex may contain other commonly used ingredients such as surfactants, anti-microbial agents, fillers/additives and the like. Due to the smaller diameter of the yarn, the distance between the fibers decrease rapidly forming a pinch region in the knitted liner and when the polymeric latex emulsion enters this region, the gelling action essentially chokes the ingress of the polymeric latex emulsion, thereby substantially preventing the entire penetration of the polymeric latex emulsion into the thickness of the knitted liner. This penetration and gelling action is sensitive to the viscosity of the polymeric latex emulsion and the depth to which the former with the coagulant coated liner is depressed into the polymeric latex emulsion tank. The higher the hydrostatic pressure, the polymeric latex emulsion penetrates more into the knitted liner. When the immersion depth is small and the viscosity of the polymeric latex emulsion is high the polymeric latex coating minimally penetrates the knitted liner resulting in poor adhesion of the coating. Therefore two controllable process variables are available for precisely and reliably controlling the penetration of the polymeric latex coating into the knitted liner, even when the knitted liner is relatively thin. These process variables are 1) the control of

TABLE I

| Product | Knitting Needle Gauge | Thickness mm | Palm wt oz/sq. yard | Clark Stiffness cm | Dry grip oz | Water grip oz | Oil grip oz | Oil permeability sec |
|---|---|---|---|---|---|---|---|---|
| Ansell 11-800 | 15 | 1.17 | 14 | 5.25 | 108 | 38 | 32 | 1-2 |
| Ansell 11-600 | 15 | 0.89 | 10 | 7.75 | 100 | NA | 26 | 23 |
| BO-500 | 15 | 0.86 | 7 | NA | NA | NA | NA | NA |
| Example I | 18 | 0.84 | 10 | 4.2 | 103 | 53 | 38 | 5 without FC >28,800 with FC |

A higher Clark stiffness number corresponds to a higher stiffness glove. The polyurethane coated Ansell 11-600 glove is rather stiff with a Clark stiffness of 7.75 cm in spite of its reduced thickness since polyurethane penetrates the entire thickness of the 15-gauge knitted liner reinforcing the liner creating a higher elastic modulus 'E', thereby decreasing deflection and flexibility. The 11-800 glove has a Clark stiff-polymeric latex emulsion viscosity and 2) depth of immersion of the knitted liner dressed former. Typical depth of immersion needed to achieve this aqueous polymeric latex emulsion to a depth greater than half the thickness of the knitted liner to a penetration that is less than the entire thickness is 0.2 to 5 cm, based on the viscosity of the latex emulsion. Since a latex coating of the glove is generally provided on the palm and finger areas of the glove, the former is articulated using a complex mechanism that moves the form in and out of the latex emulsion, immersing various portions of the knitted liner dressed on the former to progressively varying depths. As a result, some portions of the glove may have some degree of latex penetration, however, more than 75% of the knitted liner is penetrated at least half way or more than halfway without showing latex stain on the skin-contacting surface of the glove. The first embodiment of the process produces a thin continuous latex gelled layer on a thin knitted liner is washed first and is subsequently heated to vulcanize the latex composition and is washed to remove coagulant salts and other processing chemicals used to stabilize and control viscosity and wetting characteristics of the latex emulsion. The glove thus produced is better than 30% less in weight and thickness compared to a 15-gauge glove, and has better than three times the flexibility.

In a second embodiment of the invention, the polymeric latex emulsion used is foamed. The air content is typically in the 5 to 50% range on a volume basis. The polymeric latex emulsion may contain additional surfactants such as TWEEN 20 to stabilize the latex foam. Once the latex is foamed with the right air content and the viscosity is adjusted, refinement of the foam is undertaken by using the right whipping impeller stirrer driven at an optimal speed first and the air bubble size is refined using a different impeller run at a reduced speed. This foamed polymeric latex emulsion generally has a higher viscosity and therefore is more difficult to penetrate the interstices between the yarns in the knitted liner and may require a higher depth of immersion of the former with dressed knitted liner. The penetrated foamed latex emulsion instantly gels due to the action of the coagulant resident of the surfaces of the yarns forming chocking regions between the fibers preventing further entry of the foamed latex emulsion into the thickness of the knitted liner. The air cells reduce the modulus of elasticity of the polymeric latex coating increasing the flexibility of the glove. The air content in the range of 5-15 volumetric percentile results in foams that have closed cells and the polymeric latex coating is liquid impervious. This coating has a spongy soft feel. Some of the air cells adjacent to the external surface open out providing increased roughness and have the ability to remove boundary layer of oil and water from a gripping surface, providing increased grip. When the volumetric air content is in the range of 15-50%, the air cells are adjacent to each other and during vulcanization heating step, they expand, touch each other creating an open celled foam. The polymeric latex coating of the glove is breathable and the glove does not become clammy. If a drop of liquid is placed on a glove in the palm portion, the liquid may penetrate the polymeric latex coating especially when the glove is worn due to the stretching of the open air cells. This liquid penetration can be minimized or prevented depending on the size of the openings in the air cell by applying an aqueous fluorochemical dispersion coating. The dispersion generally consists of fluorochemical composition dispersed in an aqueous solvent medium to form a coating that is typically 0.5 to 2 micron in thickness. The aqueous fluorochemical dispersion coating may also be applied to portions of the knitted liner that is not covered by the polymeric latex coating. The fluorochemical coating may be applied to the gelled latex prior to vulcanization and the coating cures together with the latex polymer. The fluorochemical coating may be equally well applied to unfoamed latex coating to prevent oil or water penetration through occasional imperfections in the latex coating of the glove.

Figure 2:
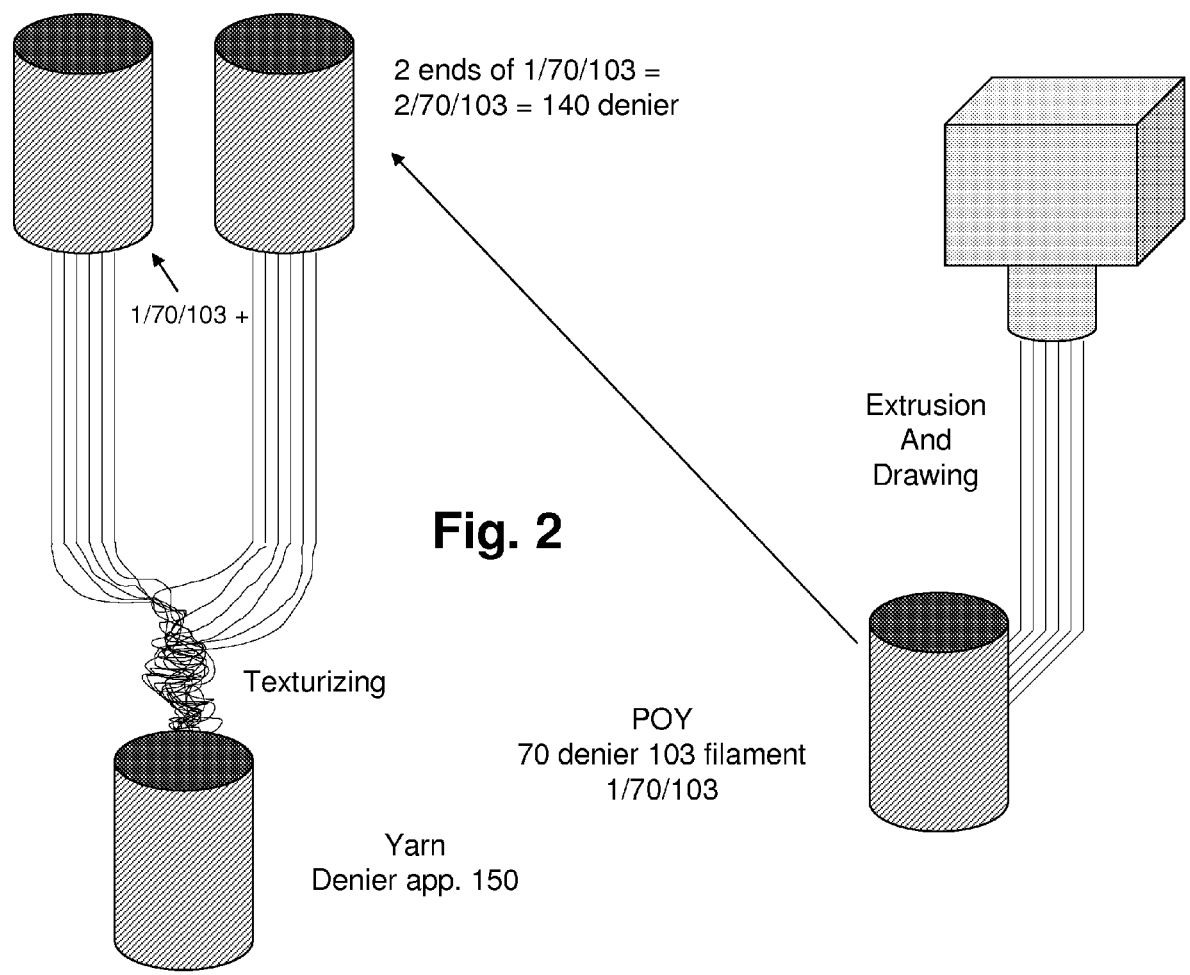
FIG. 2 illustrates a yarn that can be used in accordance with one aspect of the present invention.

FIG. 2 illustrates a yarn that can be used in the liner in accordance with an aspect of the present invention. In one embodiment of the present invention, the yarn is a combination of yarns. The combination of yarns can have a denier of approximately 140 to 150. The process illustrated is a standard technique, but the yarn produced is suitable for knitting with an 18-gauge needle and produces a lightweight, smaller thickness knitted liner suited for glove production according to the present invention. Any yarn or combination of yarns can be used in the various aspects of the present invention.

Figure 3:
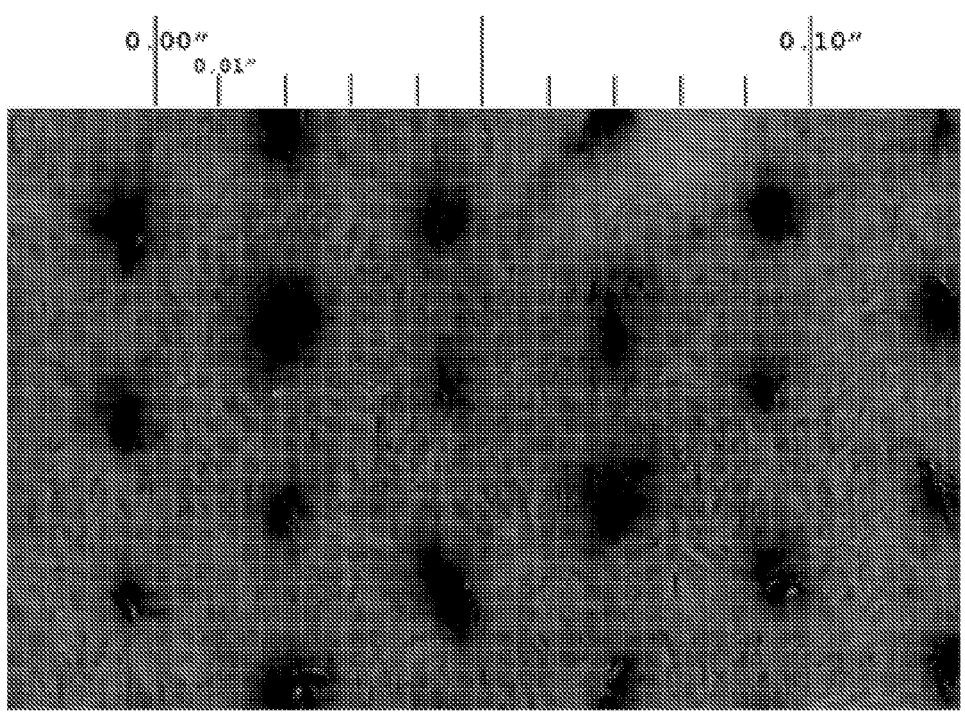
FIG. 3 is a photograph of a glove made with a knitting machine using a 15-gauge needle representing a prior art knitted liner.
Figure 4:
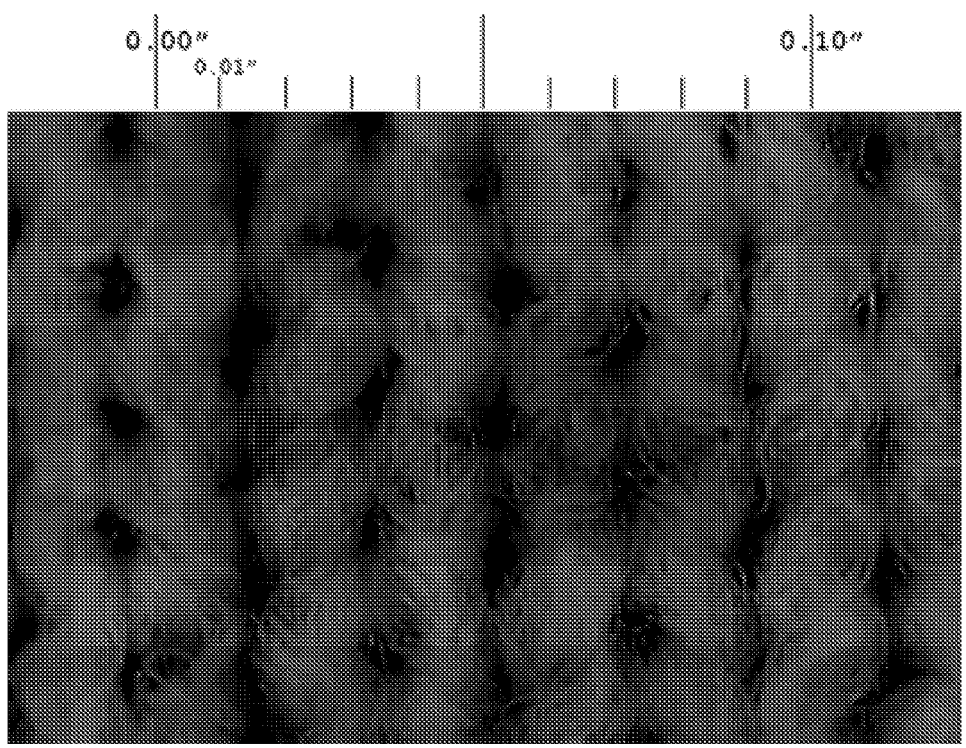
FIG. 4 is a photograph of a glove made with a knitting machine using an 18-gauge needle in accordance with one aspect of the present invention.

FIG. 3 is a scaled photograph of a prior art liner made using a knitting machine having a 15-gauge needle. The lighter areas in the photograph represent the yarn and the dark areas represent spaces between the yarns. The yarn fibers are large in diameter and the space between the yarns is also correspondingly larger. Similarly, FIG. 4 is a scaled photograph of a liner of an aspect of the present invention made using a knitting machine having an 18-gauge needle, with the lighter areas representing yarn and the darkened areas representing space between the yarn. The 18-gauge yarn that is 140 denier is much smaller in diameter and the knitting process produces smaller space between the yarns. These photographs illustrate that the spacing between the yarns is approximately one time the diameter of the yarn both with 15-gauge needle or 18-gauge needle, however, the present invention uses 221 or smaller denier yarns to produce a light weight more flexible thinner gloves.

Figure 5:
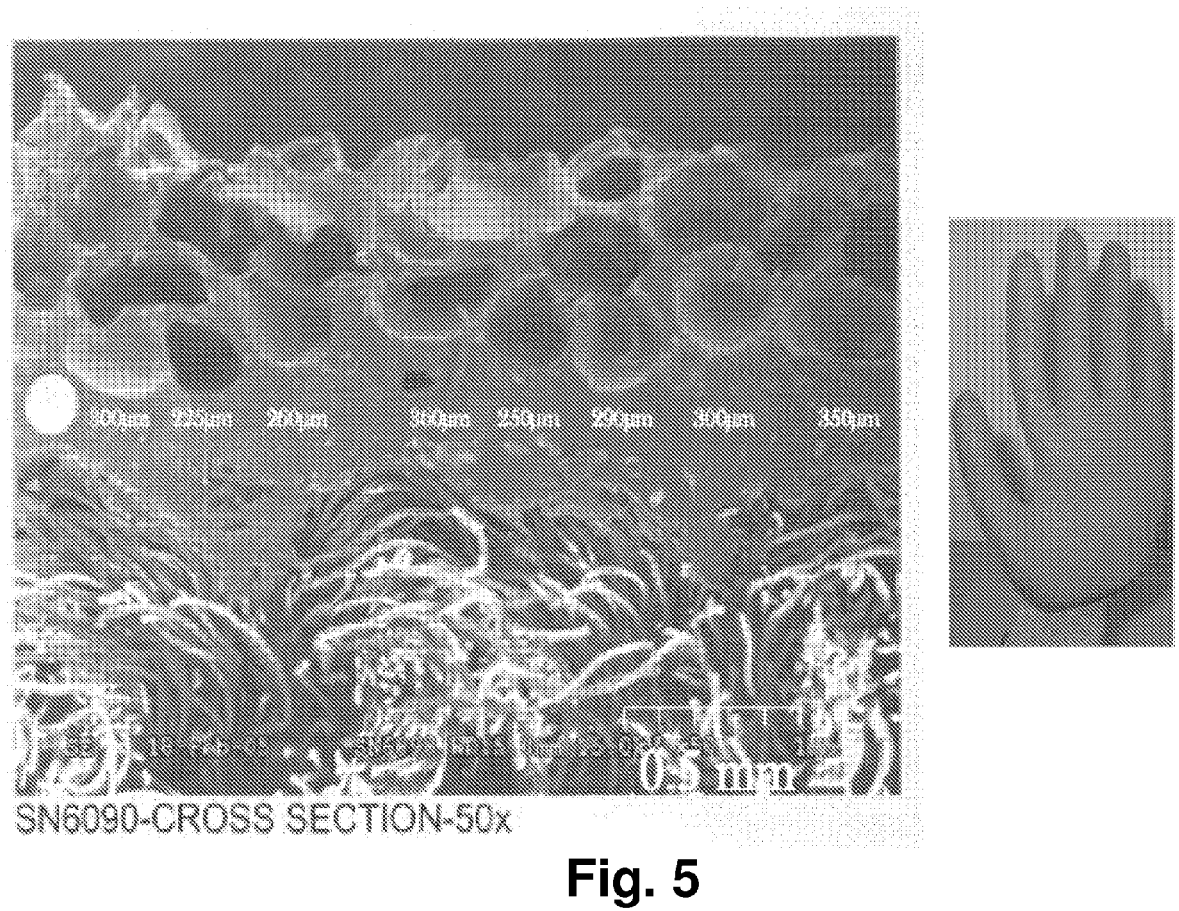
FIG. 5 is an SEM photomicrograph of the cross-section and upper surface of a glove wherein the latex surface is provided with a pluralities of cavities.

FIG. 5 illustrates an SEM micrograph of a latex glove at 50X showing its cross-section and a portion of angled view of the upper surface of the glove when the latex layer is provided with cavities. The figure also shows the glove in full magnification wherein the latex surface at the finger and palm portions are provided with a plurality of cavities. The micrograph of a reference marker showing 1 mm distance with 10 dots each separated by 0.1 mm. A scale is drawn directly at the 1 mm marker to represent 5 dots or 0.5 mm. Using this scale each of the cavities that are cross sectioned are measured and their dimension is shown directly below each of the cavities. The cavities are shown to be 300 µm, 225 µm, 260 µm, 360 µm, 250 µm, 290 µm, 300 µm and 350 µm. The cavities are nearly uniformly distributed with a mean cavity size of 292 µm. The standard deviation of this size is 47 µm, which reflects a small sample size. The knitted liner of the glove extends below the bottom portion of the micrograph and the grey colored latex penetrates more than half way but does not penetrate all the way into the liner. The cross section of the latex layer shows half-moon shaped cross-section of the cavities at the cut edge. The portion of the upper surface beyond this portion represents a shallow angled view of the upper surface and shows nearly uniform distribution of the cavities in the gripping surface of the latex glove.

Having thus described various aspects of the invention in rather full detail, it will be understood that such detail need not be strictly adhered to, but that additional changes and modifications may suggest themselves to one skilled in the art, all falling within the scope of the invention as defined by the subjoined claims.

What is claimed is:
1. A glove, comprising:
a knitted skin-contacting liner having a plurality of stitches made from one or more yarns having a total denier of 221 or less; and
a polymeric latex coating adhered to the knitted liner;
the polymeric latex coating penetrating half way or more through a thickness of the skin-contacting knitted liner, and for at least a portion of the skin-contacting knitted liner, the polymeric latex coating does not penetrate the entire thickness of the knitted skin-contacting liner; and the polymeric latex coating having a thickness in a range of 0.75 to 1.25 times the thickness of the knitted skin-contacting liner.

2. The glove of claim 1, wherein a skin-contacting surface of the knitted liner is substantially free of the polymeric latex coating.

3. The glove of claim 2, wherein the skin-contacting surface of the knitted liner is approximately 75% or more free of the polymeric latex coating.

4. The glove of claim 1, wherein a spacing between the stitches is from approximately one to approximately three times the diameter of the yarn.

5. The glove of claim 1 wherein the yarn has a total denier in a range from approximately 70 to approximately 221.

6. The glove of claim 1 wherein the polymeric latex coating has a plurality of cavities.

7. The glove of claim 6 wherein the plurality of cavities are uniformly distributed.

8. The glove of claim 6 wherein the plurality of cavities range have a size from approximately 225 µm to approximately 350 µm.

9. The glove of claim 1, wherein the stitches are formed by an 18-gauge needle.

10. The glove of claim 1, wherein the glove has a thickness in a range of from approximately 0.60 to approximately 1.14 mm.

11. The glove of claim 10, wherein the thickness is from approximately 0.70 to approximately 0.90 mm.

12. The glove of claim 1, wherein the glove is lightweight.

13. The glove of claim 1, wherein the glove is flexible.

14. The glove of claim 13, wherein the glove has a Clark stiffness number of less than approximately 5 cm.

15. The glove of claim 1, wherein the polymeric latex coating is selected from the group consisting of natural rubber, synthetic polyisoprene, styrene-butadiene, carboxylated or non-carboxylated acrylonitrile-butadiene, polychloroprene, polyacrylic, butyl rubber, a water-based polyester-based polyurethane, a water-based polyether-based polyurethane, or combinations thereof.

16. The glove of claim 15, wherein the polymeric latex coating comprises carboxylated acrylonitrile-butadiene.

17. The glove of claim 1, wherein the yarn comprises nylon 66.

18. The glove of claim 1, wherein the polymeric latex coating is foamed.

19. The glove of claim 18, wherein the polymeric latex coating has an air content in the range 5% to 50% on a volume basis.

20. The glove of claim 19, wherein the polymeric latex coating is a closed cell foam with an air content in the range 5% to 15% on a volume basis.

21. The glove of claim 18, wherein the polymeric latex coating is an open cell foam with an air content in the range 15% to 50% on a volume basis.

22. The glove of claim 1, wherein the polymeric latex coating is coated with an aqueous fluorochemical dispersion coating on the surface distal from the knitted liner adherent surface.

23. The glove of claim 22 wherein the latex coating is unfoamed and the fluorochemical dispersion is applied to the unfoamed latex coating.

24. The glove of claim 22 wherein the latex coating is foamed and the fluorochemical dispersion is applied to the foamed latex coating.

25. The glove of claim 22, wherein the coating of aqueous fluorochemical dispersion has a thickness in a range of from approximately 0.5 to approximately 2 micron.

* * * * *